UNITED STATES PATENT OFFICE.

OSCAR BALLY, OF MANNHEIM, GERMANY, ASSIGNOR TO THE BADISCHE ANILIN AND SODA FABRIK, OF LUDWIGSHAFEN, GERMANY.

VIOLET ANTHRAQUINONE DYE.

SPECIFICATION forming part of Letters Patent No. 648,332, dated April 24, 1900.

Application filed January 24, 1900. Serial No. 2,642. (No specimens.)

*To all whom it may concern:*

Be it known that I, OSCAR BALLY, doctor of philosophy, a citizen of the Swiss Republic, residing at Mannheim, in the Grand Duchy of Baden and Empire of Germany, have invented new and useful Improvements in Coloring-Matters of the Anthraquinone Series, of which the following is a specification.

In the specifications of Letters Patent Nos. 631,607 and 631,608 I described the production of brominated derivatives of diamido-anthraquinones. My present invention relates to the manufacture of violet to blue-violet coloring-matters by treatment of the said brominated derivatives with boracic-acid and sulfuric-acid solution and subsequently sulfonating. The following example will serve to further illustrate my invention and the manner in which it is carried into practical effect and my new coloring-matter obtained. The parts are by weight.

Example: Prepare a mixture of one hundred (100) parts of the bromin derivative of 1.5-diamido-anthraquinone (such as can be obtained by treating diamido-anthraquinone in glacial acetic acid with an excess of bromin) and one hundred (100) parts of boracic acid. Add this mixture at the ordinary temperature and while stirring to about two thousand (2,000) parts of concentrated sulfuric acid, (containing about ninety-six per cent. $H_2SO_4$.) A solution is gradually obtained, and the whole mass assumes a violet color. Then heat the melt at a temperature of 100° centigrade until the color has become pure blue. Next add about two thousand (2,000) parts of fuming sulfuric acid, (containing forty per cent. free anhydride,) and heat this mixture at a temperature of 130° centigrade until the coloring-matter is readily soluble in water.

My new coloring-matter is soluble in water and dyes wool from the acid-bath, giving violet shades which become bluer upon subsequent treatment with bichromate of potash. Upon chrome-mordanted wool the coloring-matter gives violet-blue shades. The solution in hot water is violet blue, in caustic soda it is blue, in alcohol blue violet, in anilin pure blue, and in concentrated sulfuric acid yellow.

Now what I claim is—

The herein-described new article of manufacture the new coloring-matter which can be obtained by treatment of halogen derivatives of diamido-anthraquinone with boracic acid and sulfuric acid, and subsequently sulfonating and which contains halogen and is readily soluble in hot water, soluble in caustic soda, alcohol, and anilin, and which yields a yellow solution in concentrated sulfuric acid.

In testimony whereof I have hereunto set my hand in the presence of two subscribing witnesses.

OSCAR BALLY.

Witnesses:
ERNEST F. EHRHARDT,
PERCY J. JONES.